United States Patent
Alvarez-Troncoso

(10) Patent No.: US 7,560,904 B2
(45) Date of Patent: Jul. 14, 2009

(54) METHOD AND SYSTEM OF MANAGING POWER DISTRIBUTION IN SWITCH BASED CIRCUITS

(75) Inventor: Ignacio Alvarez-Troncoso, Valls Tarragone (ES)

(73) Assignee: Lear Corporation, Southfield, MI (US)

( * ) Notice: Subject to any disclaimer, the term of this patent is extended or adjusted under 35 U.S.C. 154(b) by 199 days.

(21) Appl. No.: 11/163,036

(22) Filed: Oct. 3, 2005

(65) Prior Publication Data

US 2007/0075677 A1      Apr. 5, 2007

(51) Int. Cl.
*H02J 7/00* (2006.01)
(52) U.S. Cl. .................. 320/166; 320/104; 320/123; 320/137; 318/139
(58) Field of Classification Search ................. 320/104, 320/107, 123, 137, 166; 307/10.1; 318/139
See application file for complete search history.

(56) References Cited

U.S. PATENT DOCUMENTS

| | | | |
|---|---|---|---|
| 4,636,705 A | 1/1987 | Bowman | |
| 5,898,282 A | 4/1999 | Drozdz et al. | |
| 6,230,496 B1* | 5/2001 | Hofmann et al. | ............... 60/706 |
| 6,420,793 B1* | 7/2002 | Gale et al. | .................... 290/34 |
| 6,476,571 B1 | 11/2002 | Sasaki | |
| 2002/0171397 A1 | 11/2002 | Adrian et al. | |
| 2003/0146726 A1 | 8/2003 | Ishikawa et al. | |
| 2003/0197489 A1 | 10/2003 | Prabhu et al. | |
| 2004/0212352 A1 | 10/2004 | Anzawa et al. | |
| 2005/0005814 A1 | 1/2005 | Kumar et al. | |
| 2005/0046280 A1* | 3/2005 | Itabashi et al. | .............. 307/131 |
| 2005/0099155 A1 | 5/2005 | Okuda et al. | |

FOREIGN PATENT DOCUMENTS

| | | |
|---|---|---|
| DE | 19651612 A1 | 6/1998 |
| DE | 10020304 A1 | 10/2001 |
| DE | 10132655 A1 | 3/2002 |
| DE | 10324250 A1 | 12/2004 |
| DE | 10348162 B3 | 1/2005 |
| GB | 2 385 218 A | 8/2003 |
| GB | 2 406 724 A | 4/2005 |
| GB | 2 425 412 A | 10/2006 |
| JP | 10309002 A | 11/1998 |
| WO | 0215363 A2 | 2/2002 |

OTHER PUBLICATIONS

German Office Action for corresponding Application No. 10 2006 041 079.3-34, mailed Aug. 19, 2008, 4 pages.
German Office Action for corresponding application No. 10 2006 041 079.3, mailed Nov. 13, 2008, 4 pages.

\* cited by examiner

*Primary Examiner*—Akm E Ullah
*Assistant Examiner*—Arun Williams
(74) *Attorney, Agent, or Firm*—Brooks Kushman P.C.

(57) ABSTRACT

Method and systems of managing power distribution in switch based circuits. The method and system including a number of switches for controlling power distribution. The method and system further including a number of voltage elevators associated with each switch to facilitate the activation thereof.

11 Claims, 3 Drawing Sheets

US 7,560,904 B2

METHOD AND SYSTEM OF MANAGING POWER DISTRIBUTION IN SWITCH BASED CIRCUITS

BACKGROUND OF THE INVENTION

1. Field of the Invention

The present invention relates to method and systems of managing power distribution in switch based circuits.

2. Background Art

Switch based circuits, for the purposes of the present invention, may be characterized as any circuit arrangement where electrically activated switches, like transistors, are used to control or otherwise manage energy flow through portions of the circuit. As one skilled in the art will appreciate, there are any number of applications which may employ switches to manage power distribution.

One problem encountered in a number of these applications relates to properly driving the switches to support desired operations and activations. With respect to transistors, for example, in order to properly activate the transistor (switch), a gate-to-source voltage (Vgs) must be greater than a voltage threshold (Vt) of the transistor.

Accordingly, a need exists to control or otherwise regulate the gate-to-source voltage (Vgs).

SUMMARY OF THE INVENTION

One non-limiting aspect of the present invention relates to a system of managing power distribution in a hybrid electric vehicle having an a number of switches for controlling energy flow between an alternator, ultracapacitor, battery, and electric motor. The system may include a sufficient number of switches associated with each of the ultracapacitor and battery to manage separately flowing energy between the alternator and motor, alternator and ultracapacitor, alternator and battery, ultracapacitor and battery, ultracapacitor and motor, battery and ultracapacitor, and battery and motor. The system may further include a voltage elevator associated with each switch and configured for outputting a voltage (VEout) to activate the associated switch and a controller for controlling the separate energy flow between the alternator, ultracapacitor, battery, and electric motor by controlling activation of the voltage elevators, and thereby, the associated switches.

The system may further include the voltage elevators being configured to output the voltage (VEout) as a function of an inputted reference voltage (Vref) boosted according to a fixed elevator voltage (VEfixed). Optionally, the fixed voltage (VEfixed) is associated with an activation threshold voltage (Vt) of the switches and/or with a voltage of the associated ultracapacitor (Vcap) or battery (Vbat). The system may further include the switches being transistors and the fixed voltage (VEfixed) corresponds with a desired gate-to-source voltage (Vgs) of the transistors associated with the activation thereof such that the fixed voltage (VEfixed) equals the desired gate-to-source voltage (Vgs) if the inputted reference voltage (Vref) equals a source voltage (Vs) of the associated transistor.

The system may further include three switches are associated with each of the ultracapacitor and battery to control the separate energy flow between the alternator, ultracapacitor, battery, and electric motor. Optionally, the three voltage elevators associated with the switches of the ultracapacitor may be configured to activate the associated switch as a function of a fixed voltage boost to a reference voltage associated with the ultracapacitor and the three voltage elevators associated with the switches of the battery may be configured to activate the associated switch as a function of a fixed voltage boost voltage to a reference voltage associated with the battery.

One non-limiting aspect of the present invention relates to a system of managing power distribution in a circuit having an a number of switches for controlling energy flow between first and second energy storage devices. The system may include a sufficient number of switches associated with each of the energy storage devices to manage energy flow between the energy storage devices, power source, and load. The system may further include a voltage elevator associated with each switch and configured for outputting a voltage (VEout) to activate the associated switch and a controller for controlling the energy flow between the energy storage devices, power source, and load by controlling activation of the voltage elevators, and thereby, the associated switches.

One non-limiting aspect of the present invention relates to a method of managing power distribution in a hybrid electric vehicle having an a number of switches for controlling energy flow between an alternator, ultracapacitor, battery, and electric motor. The method may include associating a sufficient number of switches with each of the ultracapacitor and battery to manage separately flowing energy between the alternator and motor, alternator and ultracapacitor, alternator and battery, ultracapacitor and battery, ultracapacitor and motor, battery and ultracapacitor, and battery and motor. The method may further include associating a voltage elevator with each switch and configured for outputting a voltage (VEout) to activate the associated switch and controlling the separate energy flow between the alternator, ultracapacitor, battery, and electric motor by controlling activation of the voltage elevators, and thereby, the associated switches.

The method may further include outputting the voltage (VEout) as a function of an inputted reference voltage (Vref) boosted according to a fixed elevator voltage (VEfixed). If the switches are transistors, the method may include fixing the fixed voltage (VEfixed) to corresponds with a desired gate-to-source voltage (Vgs) of the transistors associated with the activation thereof such that the fixed voltage (VEfixed) equals the desired gate-to-source voltage (Vgs) if the inputted reference voltage (Vref) equals a source voltage (Vs) of the associated transistor.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
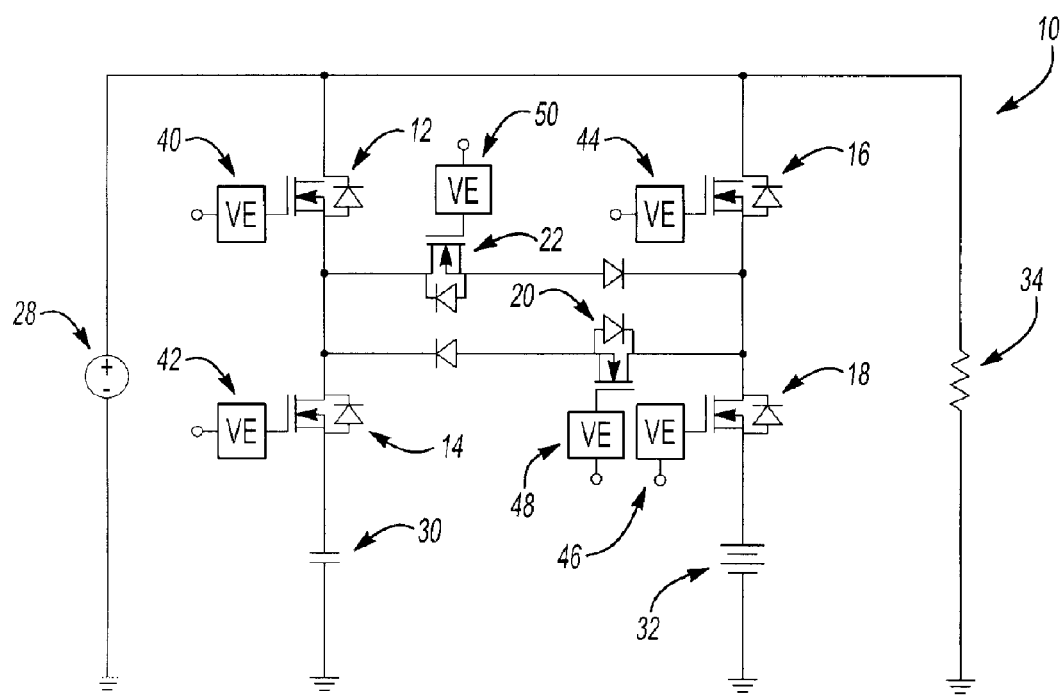
FIG. 1 illustrates a schematic diagram of a switch based circuit in accordance with one non-limiting aspect of the present invention.

FIG. 1 illustrates a schematic diagram of a switch based circuit 10 in accordance with one non-limiting aspect of the present invention. The circuit 10 may be associated with any number of applications that include a number of switches 12-22 for managing energy flow. For exemplary purposes and without intending to limit the scope and contemplation of the present invention, FIG. 1 is described with respect to a hybrid electric vehicle application.

The circuit 10 may be configured to support energy flow between an alternator 28, an ultracapacitor 30, a battery 32, and an electric motor or other load 34. The alternator 28 may be connected to a generator (not show) or other feature connected to an engine (not shown) that is configured to generate electric power such that the alternator 28 may be consider as a power source. The electric motor 34 may be any suitable electrically driven device or other load having capabilities suited for powering a vehicle. The load 34 may also be associated with other power consuming features within the vehicle, such as instrument, air conditioner, electronics, and other vehicle loads.

The ultracapacitor 30 and battery 32 may be passive energy storage devices configured to passively stored and release electrical energy. In contrast, the electrical consumption and release of the alternator 28 and load 34 may be controlled by a vehicle system controller or other controller (not shown). The controller may be configured to control activation of the switches 12-22, and thereby, control storage and release of energy from each of the ultracapacitor 30 and battery 32.

The ultracapacitor 30 may be any suitable capacitor having properties sufficient for storing and releasing energy to the electric motor 34. Similarly, the battery 32 may be any suitable battery having properties sufficient for storing and releasing energy to the electric motor 334. The ultracapacitor 30 and battery 32 combination is commonly used in hybrid electric vehicles as the ultracapacitor 30 is typically valuable for quick discharges and charges and the battery 32 is typically valuable for extended energy storage, and for any number of other reasons.

The switches 12-22 may be any electrically controllable switches 12-22. For exemplary purposes, the switches 12-22 are illustrated as transistors and associated with one of a number of voltage elevators 40-50. The transistors 12-22 can be electrically activated to permit current flow from a drain to gate if a sufficient voltage differential between a gate and the source (Vgs) occurs. The voltage elevators 40-50 output a voltage (VEout) to the gate of each transistor 12-22 such that a gate voltage (Vg) of each transistor 12-22 corresponds with the outputted voltage (VEout) of the associated voltage elevator 40-50.

The voltage elevators 40-50 include an input for receiving a reference voltage (Vref). The voltage elevators 40-50 are configured to boost the inputted reference voltage (Vref) such that the outputted voltage (VEout) corresponds with the inputted reference voltage (Vref) plus a voltage boost (VEboost). The voltage elevators 40-50 may comprise any suitable integrated circuit or other feature having capabilities for boosting the inputted reference voltage (Vref).

The boosting of the voltage elevators 40-50 may corresponding with a voltage threshold (Vt) of the transistors 12-22. The voltage threshold (Vt) corresponds with the minimum voltage differential between the gate and source (Vgs) required to activate the corresponding transistors 12-22. The voltage boost (VEboost) may be selected to correspond with voltage threshold (Vt) such that the outputted voltage (VEout) corresponds with the reference voltage (Vref) plus the voltage threshold (Vt).

The reference voltages (Vref) may be tied to source voltages (Vs) of the transistors 12-22 such that the voltage output (VEout) equals the source voltage (Vs) plus the voltage threshold (Vt). This relationship insures the gate voltage (Vg) of each transistor 12-22 is elevated relative to the corresponding source voltage (Vs) by the boost voltage (VEboost), which is at least equal to the threshold voltage (Vt). Consequently, the gate voltage (Vg) is always greater than the source voltage (Vs) such that the gate-to-source voltage (Vgs) is greater than the voltage threshold (Vt) and sufficient to support energy flow from the drain to the source when activated.

Tying the inputted voltage references (Vref) to the source voltages (Vs) of the associated transistor 12-22 limits the influence of voltage changes in the ultracapacitor 30 and battery 32 from interrupting operability of the circuit 10. In more detail, in some cases an ultracapacitor voltage (Vcap) may vary between 3 and 14V. Because the reference voltage of the transistor 12-22 is tied to the source voltage (Vs) the gate voltage of the transistor 12-22 is always equal to the capacitor voltage (Vcap) plus the boost voltage (VEboost), thereby insuring a proper gate-to-source voltage (Vgs) for activation of the transistor 12-22.

The controller may be configured to independently control activation of each of the switches (transistor) 12-22 to manage power distribution within the circuit. The ability of the present invention to independently control each of the switches 12-22, and thereby the power flow, is especially advantageous during operation of the hybrid electric vehicle when the energy storage capacities of the ultracapacitor 30 and battery 32 may be changing rapidly.

Figure 2:
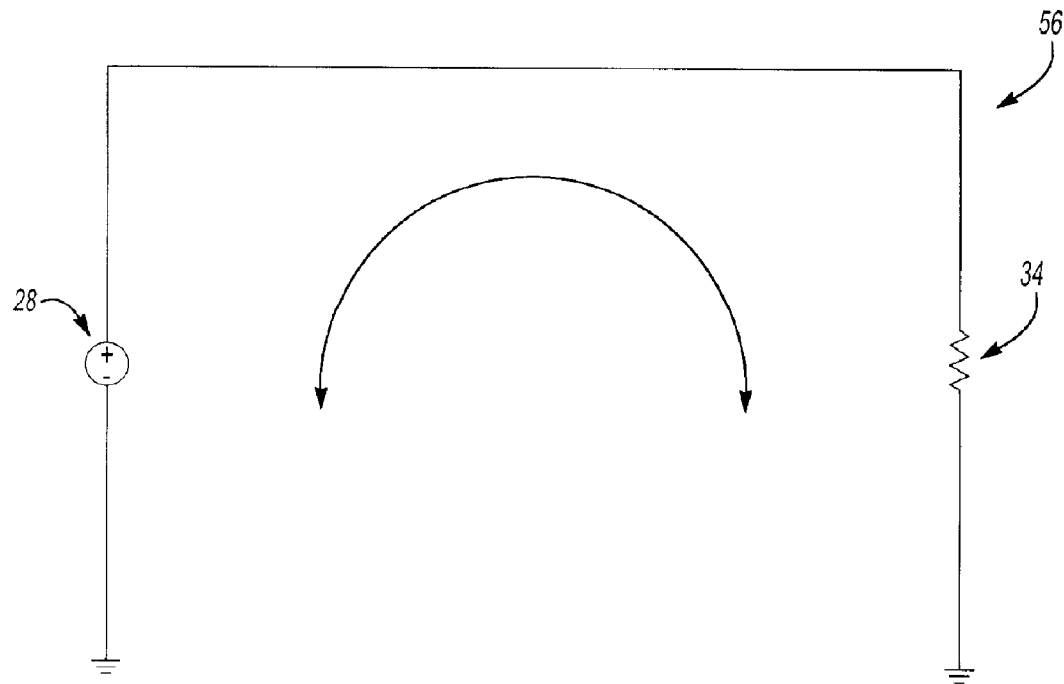
FIG. 2 illustrates an equivalent circuit for controlling energy flow between an alternator and a motor in accordance with one non-limiting aspect of the present invention.

FIG. 2 illustrates an equivalent circuit 56 for controlling energy flow between the alternator 30 and the motor 34 in accordance with one non-limiting aspect of the present invention. Each of the switches 12-22 are inactive such that current flows between the alternator 30 and load 34 as indicated. This flow of energy may be used to power the motor 34 with electrical energy from the alternator 30 and/or to flow energy from the motor 34 to the alternator 30 if the electric motor is operating in a regeneration mode.

Figure 3:
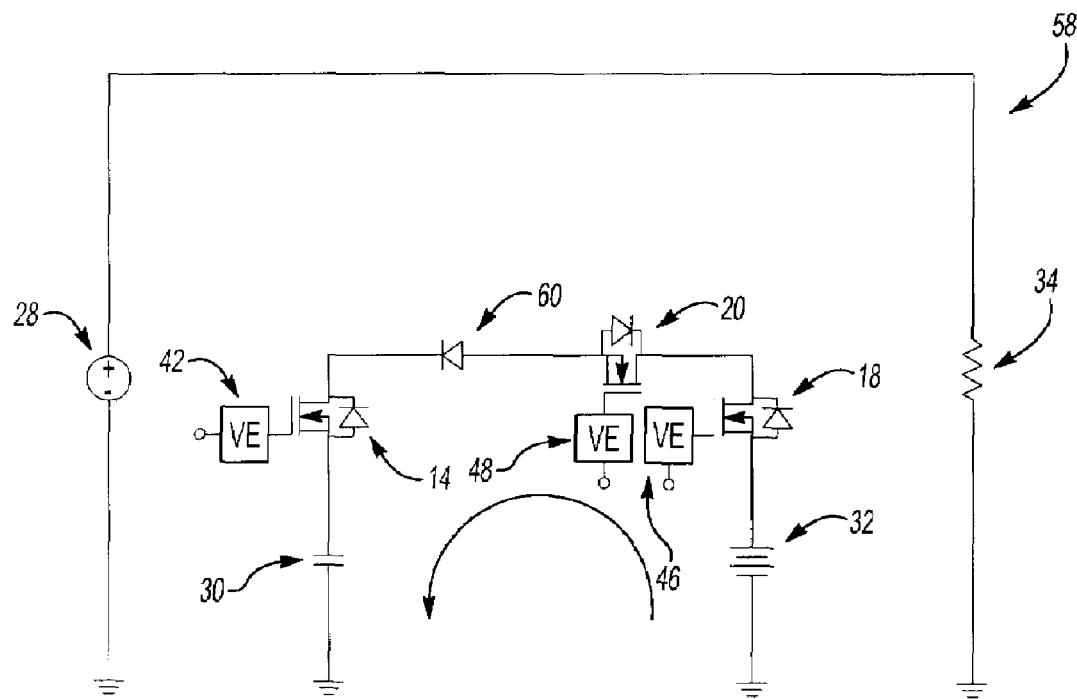
FIG. 3 illustrates an equivalent circuit for controlling energy flow from a battery to an ultracapacitor in accordance with one non-limiting aspect of the present invention.

FIG. 3 illustrates an equivalent circuit 58 for controlling energy flow from the battery 32 to the ultracapacitor 30 in accordance with one non-limiting aspect of the present invention. This requires activating the second 14, fourth 18, and sixth switches 20, deactivating the other switches, and the inclusion of a diode 60 between the second 14 and sixth switches 20 to insure current flows only in one direction to the ultracapacitor 30. This flow of energy may be used to transfer energy stored in the battery 32 to the ultracapacitor 30, such as to balance the charging thereof.

Figure 4:
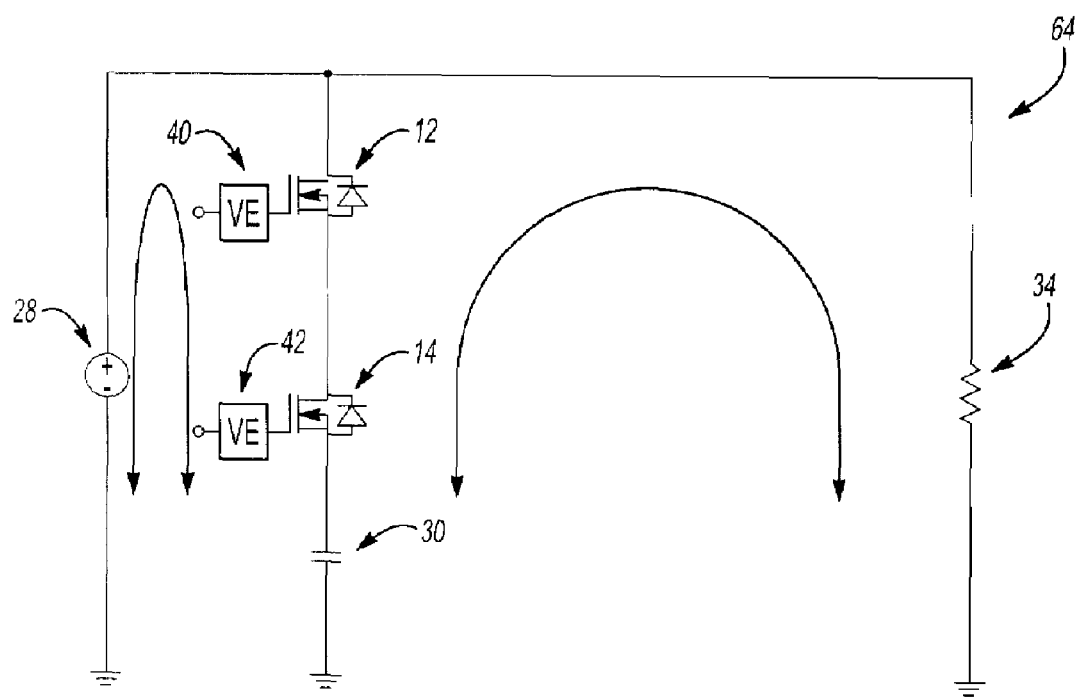
FIG. 4 illustrates an equivalent circuit for controlling energy flow either between the alternator and ultracapacitor and/or the ultracapacitor and motor in accordance with one non-limiting aspect of the present invention.

FIG. 4 illustrates an equivalent circuit 64 for controlling energy flow either between the alternator 28 and ultracapacitor 30 and/or the ultracapacitor 30 and the motor 34 in accordance with one non-limiting aspect of the present invention.

This requires activating the first 12 and second switches 14 and deactivating the remaining switches to permit the desired current flow. This flow of energy may be used to transfer energy between the ultracapacitor 30 and motor 34 for driving the motor 34 and/or for regeneratively charging the ultracapacitor 30, and/or between the alternator 28 and the ultracapacitor 30 for charging the ultracapacitor 30 and/or powering the alternator 28.

Figure 5:
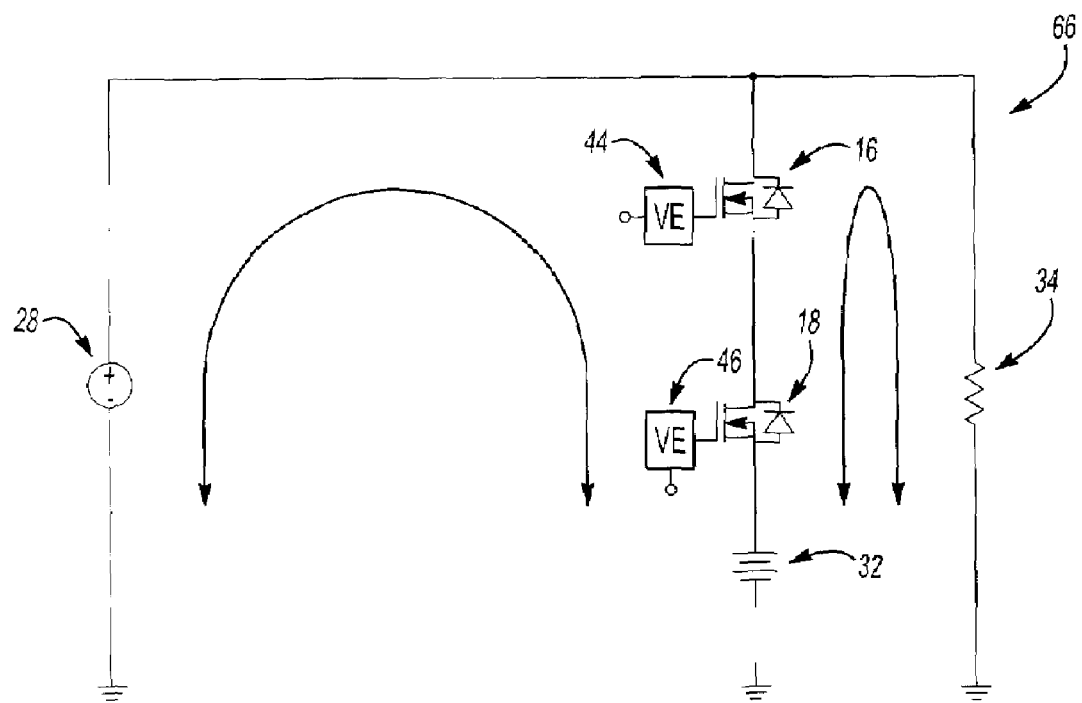
FIG. 5 illustrates an equivalent circuit for controlling energy flow either between the alternator and battery and/or the battery and motor in accordance with one non-limiting aspect of the present invention.

FIG. 5 illustrates an equivalent circuit 66 for controlling energy flow either between the alternator 28 and battery 32 and/or the battery 32 and the motor 34 in accordance with one non-limiting aspect of the present invention. This requires activating the third 16 and fourth switches 18 and deactivating the remaining switches to permit the desired current flow. This flow of energy may be used to transfer energy between the battery 32 and motor 34 for driving the motor 34 and/or for regeneratively charging the battery 32, and/or between the alternator 28 and the battery 32 for charging the battery 32 and/or powering the alternator 28.

Figure 6:
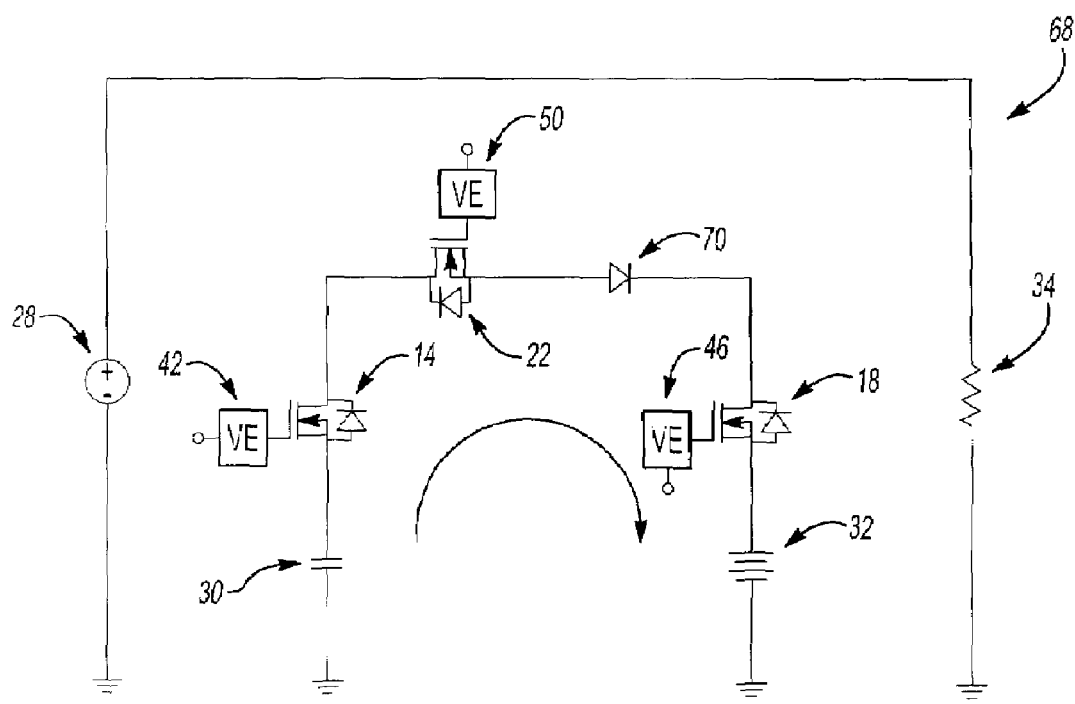
FIG. 6 illustrates an equivalent circuit 68 for controlling energy flow from the ultracapacitor 30 to the battery 32 in accordance with one non-limiting aspect of the present invention.

FIG. 6 illustrates an equivalent circuit 68 for controlling energy flow from the ultracapacitor 30 to the battery 32 in accordance with one non-limiting aspect of the present invention. This requires activating the second 14, fourth 18, and fifth switches 22, deactivating the other switches, and the inclusion of a diode 70 between the second 14 and fifth switches 22 to insure current flows only in one direction to the battery 32. This flow of energy may be used to transfer energy stored in the ultracapacitor 30 to the battery 32, such as to balance the charging thereof.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system of managing power distribution in a hybrid electric vehicle having an a number of transistors for controlling energy flow between an alternator, ultracapacitor, battery, and electric motor, the system comprising:
   a sufficient number of transistors associated with each of the ultracapacitor and battery to manage separately flowing energy between the alternator and motor, alternator and ultracapacitor, alternator and battery, ultracapacitor and battery, ultracapacitor and motor, battery and ultracapacitor, and battery and motor;
   at least one voltage elevator associated with each transistor and configured for boosting an inputted reference voltage (Vref) by a fixed elevator voltage (VEfixed for output as a voltage (VEout) to a gate of the associated transistor, the fixed elevator voltage (VEfixed corresponds with a minimum voltage differential between the gate and a source (Vgs) required to activate the associate transistor; and
   a controller for controlling the separate energy flow between the alternator, ultracapacitor, battery, and electric motor by controlling activation of the transistors, wherein the controller controls activation of the transistors by selecting the reference voltage (Vref) inputted to the voltage elevator of each active transistor to correspond with a source voltage (Vs) of the associated transistor.

2. The system of claim 1 wherein three transistors are associated with each of the ultracapacitor and battery to control the separate energy flow between the alternator, ultracapacitor, battery, and electric motor.

3. A system of managing power distribution in a circuit having a number of switches for controlling energy flow between first and second energy storage devices, a power source, and a load, the system comprising:
   a sufficient number of switches associated with each of the energy storage devices to manage energy flow between the energy storage devices, power source, and load;
   at least one voltage elevator associated with each switch and configured for outputting a voltage (VEout) to activate the associated switch;
   a controller for controlling the energy flow between the energy storage devices, power source, and load by controlling activation switches;
   wherein the voltage elevators output the voltage (VEout) as a function of an inputted reference voltage (Vref) boosted according to a fixed elevator voltage (VEfixed); and
   wherein the fixed voltage (VEfixed) is associated with an activation threshold voltage (Vt) of the switches.

4. The system of claim 3 wherein the fixed voltage (VEfixed) is further associated with a voltage of the associated ultracapacitor (Vcap) or battery (Vbat).

5. The system of claim 3 wherein the switches are transistors and the fixed voltage (VEfixed) corresponds with a desired gate-to-source voltage (Vgs) of the transistors associated with the activation thereof.

6. The system of claim 5 wherein the fixed voltage (VEfixed) equals the desired gate-to-source voltage (Vgs) if the inputted reference voltage (Vref) equals a source voltage (Vs) of the associated transistor.

7. The system of claim 3 wherein three switches are associated with each of the energy storage devices to control the separate energy flow between the energy storage devices, power source, and load.

8. The system of claim 7 wherein the three voltage elevators associated with the switches of the first energy storage device are configured to bias the associated switch as a function of a fixed voltage boost to a reference voltage associated with the first energy storage device and wherein the three voltage elevators associated with the switches of the second energy storage device are configured to bias the associated switch as a function of a fixed voltage boost voltage to a reference voltage associated with the second energy storage device.

9. The system of claim 8 wherein the power source is an alternator and the load is an electric motor and the first and second storage devices are passive energy storage devices.

10. A method of managing power distribution in a hybrid electric vehicle having an a number of switches for controlling energy flow between an alternator, ultracapacitor, battery, and electric motor, the method comprising:
   associating a sufficient number of switches with each of the ultracapacitor and battery to manage separately flowing energy between the alternator and motor, alternator and ultracapacitor, alternator and battery, ultracapacitor and battery, ultracapacitor and motor, battery and ultracapacitor, and battery and motor;

associating at least one voltage elevator with each switch and configuring each voltage elevator for boosting an inputted reference voltage (Vref) by a fixed elevator voltage (VEfixed) for output as a voltage (VEout) sufficient to activate the associated switch;

selecting the fixed elevator voltage (VEfixed) used to boost the inputted reference voltage (Vref) of each switch to correspond with a minimum voltage differential between the voltage (VEout) received from the voltage elevator and an output of the switch; and controlling the separate energy flow between the alternator, ultracapacitor, battery, and electric motor by controlling activation of the switches, including selecting the inputted reference voltages (Vref) inputted to the voltage elevator for each activated switch to correspond with a voltage at the output of the associated switch.

11. The method of claim 10 wherein the switches are transistors and the method includes fixing the fixed voltage (VEfixed) to corresponds with a desired gate-to-source voltage (Vgs) of the transistors associated with the activation thereof such that the fixed voltage (VEfixed) equals the desired gate-to-source voltage (Vgs) if the inputted reference voltage (Vref) equals a source voltage (Vs) of the associated transistor.

* * * * *